United States Patent
Lehberger

[11] 3,897,692
[45] Aug. 5, 1975

[54] CENTRIFUGAL PROPULSION DRIVE AND STEERING MECHANISM

[76] Inventor: Arthur N. Lehberger, A.N.L. Research & Manufacturing Co., 256 Winfield Ter., Union, N.J. 07083

[22] Filed: Dec. 13, 1972

[21] Appl. No.: 314,779

[52] U.S. Cl. .............................................. 74/84 S
[51] Int. Cl. ......................... B60k 1/00; F03g 7/08
[58] Field of Search .......... 60/721; 74/84, 84 S, 88; 180/7, 54, 65

[56] References Cited
UNITED STATES PATENTS
3,750,484    8/1973    Benjamin ........................ 60/721 X

*Primary Examiner*—Martin P. Schwadron
*Assistant Examiner*—Allen M. Ostrager
*Attorney, Agent, or Firm*—Laforest S. Saulsbury, Esq.

[57] ABSTRACT

A centrifugal propulsion drive and steering mechanism has been provided that is operable through gyratory action of a power driven base plate structure from which extend pivot arms having fly weights thereon, a pulley-like device radially and angularly adjustably offset from a central power drive shaft that the base plate with a chain and spring assembly connected to and between the flyweight pivot arms to bias the arms against spring stops and toward the direction of travel of the mechanism so that as a result of the rotation of the base plate the flyweights and gyratory are relaxed and at this time reversely operating balance power thrust weights separating to provide a forward thrust or impulse to the mechanism, one of these thrust weights being rigidly carried by the base plate and the other thrust weight rotatively carried on the base plate drive shaft to work in unison with the rigid base plate weight and driven by a reverse gear and sprocket mechanism radially offset therefrom and driven by a gear on the base plate drive shaft. Such an impulse at the time of the relaxing of the flyweights provides the power to propel the mechanism and its vehicle to which it is attached in a direct direction. The base plate structure drive shaft is driven by a rotatable source such as an electric motor, gas engine or turbine. This mechanism has use on seacraft to maneuver the same into landing docks as well as to propel it through the water, and also for use on land vehicles to propel the same and in such a manner that wheel braking may be dispensed with. A steering feature is inherent in this mechanism so that the seacraft or vehicle can be steered by it while the power is being supplied as well as propelled by it.

6 Claims, 13 Drawing Figures

PATENTED AUG 5 1975    3,897,692
SHEET 3

3,897,692

CENTRIFUGAL PROPULSION DRIVE AND STEERING MECHANISM

This invention relates to a centrifugal propulsion drive and steering mechanism for developing thrust power and a steering capability through centrifugal action.

It is an object of the present invention to provide a centrifugal propulsion drive device in the combination of relaxing fly weights which by centrifugal action will maintain equilibrium of the mechanism in a gyratory manner and by which with other weights oscillating and operating in reverse rotation from one-another will upon the relaxing of the effective moment arm of the fly weights at a critical time cause the propulsion mechanism to be moved in mass in one direction and substantially negativing at the same time movement from the opposite direction.

It is another object of the invention to provide an energy producing propulsion drive and steering mechanism resulting from centrifugal action which can be easily so installed in vehicles wherein while giving direction movement to the vehicle in one direction can also serve as an easy means for effecting the changing or transferring of direction from one direction to another and which thereby has capability of being a steering mechanism as well as a propulsion mechanism.

For a better understanding of the invention, reference may be had of the following detailed construction taken in connnection with the accompanying drawings in which FIG. 1 is a fragmentary plan view of the centrifugal propulsion drive and steering mechanism showing the arrangement of fly weights carried on the outer ends of the arms pivotally carried on a rotating base and extending between spring-biased pivot stops, the eccentric pulley-like device over which rides the interconnecting chain and spring for the arms, the integral power weight on the base plate and the reverse-operated power weight working in conjunction therewith to effect the propelling stroke.

Figure 1:
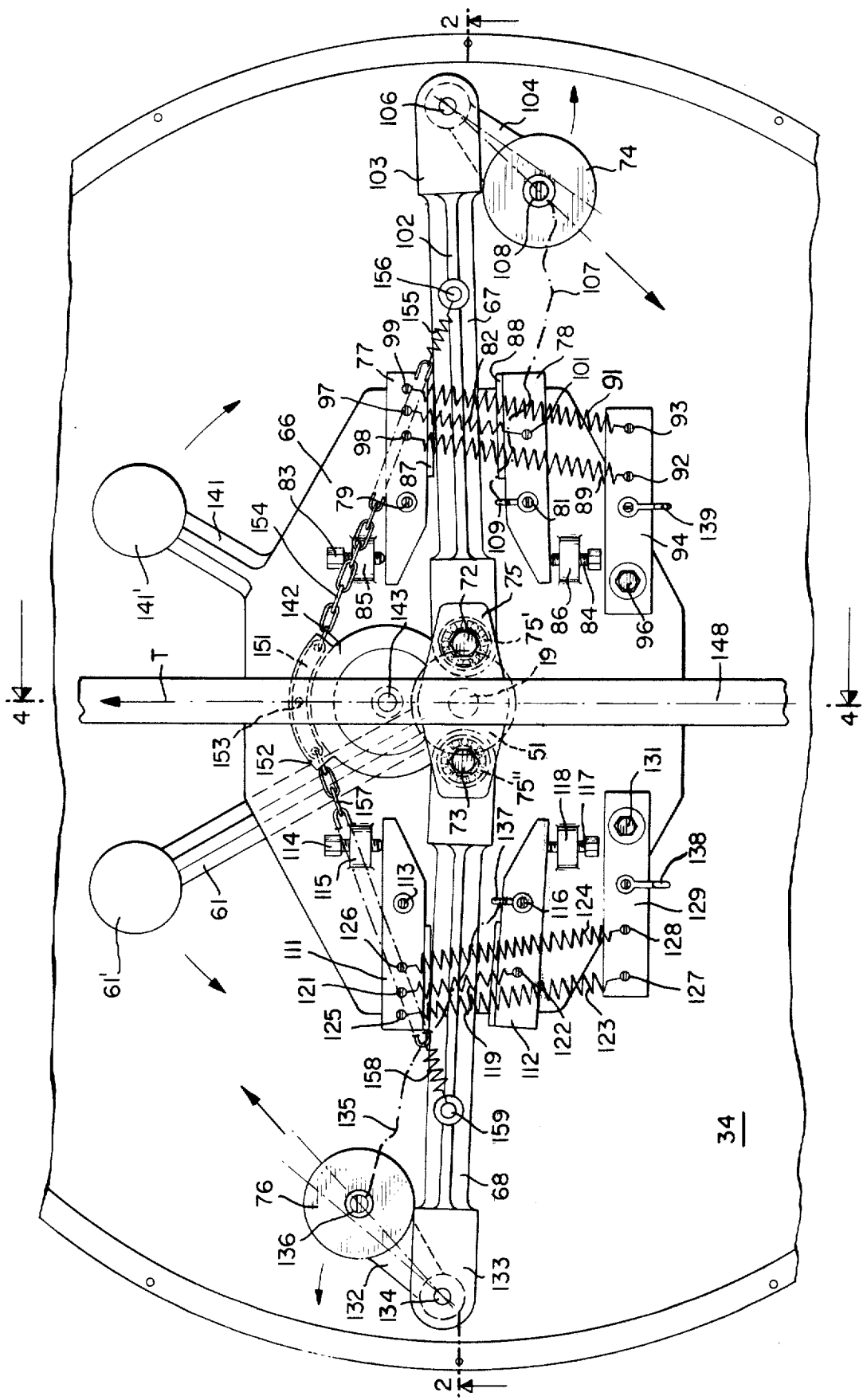
Figure 2:
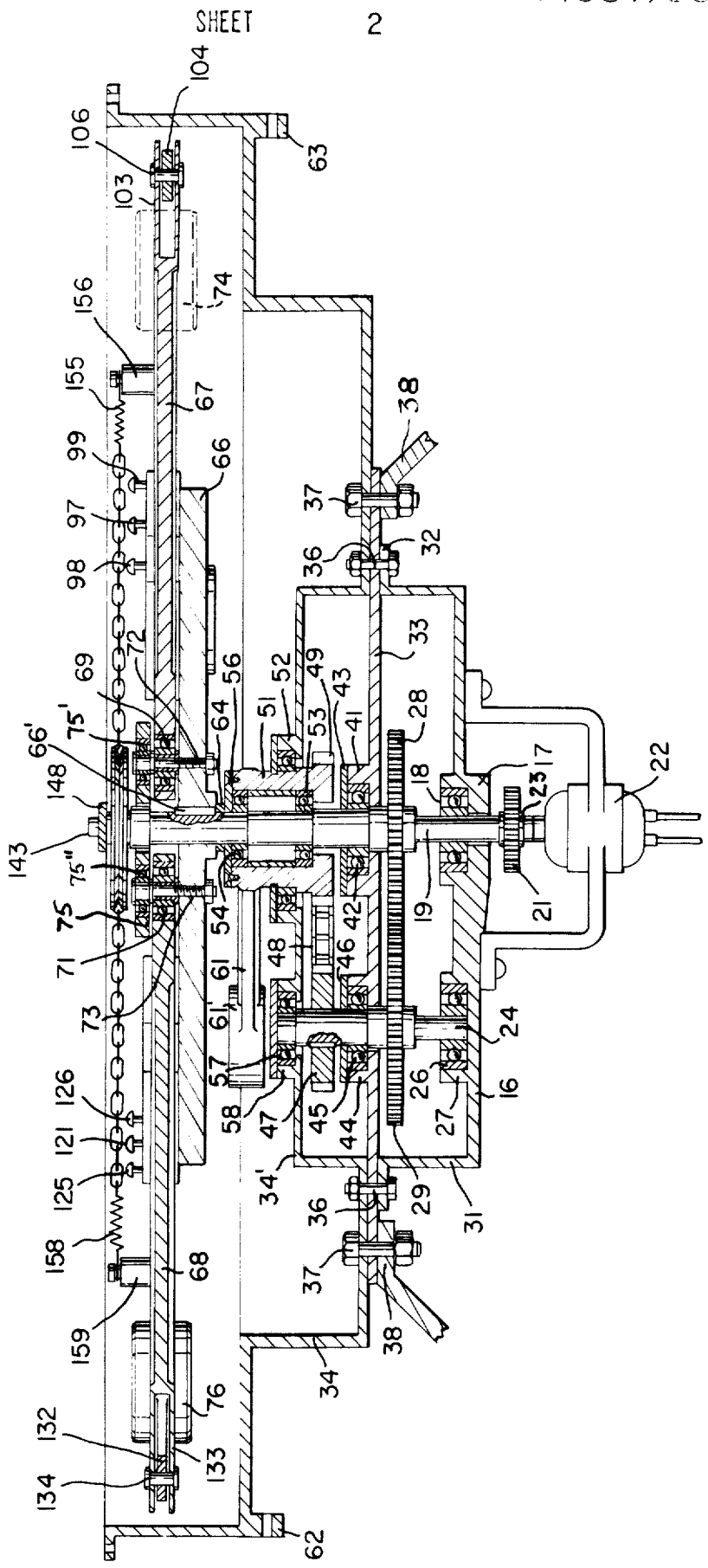
FIG. 2 is a vertical sectional view of the propulsion mechanism as viewed along lines 4—4 of FIG. 1.
Figure 4:
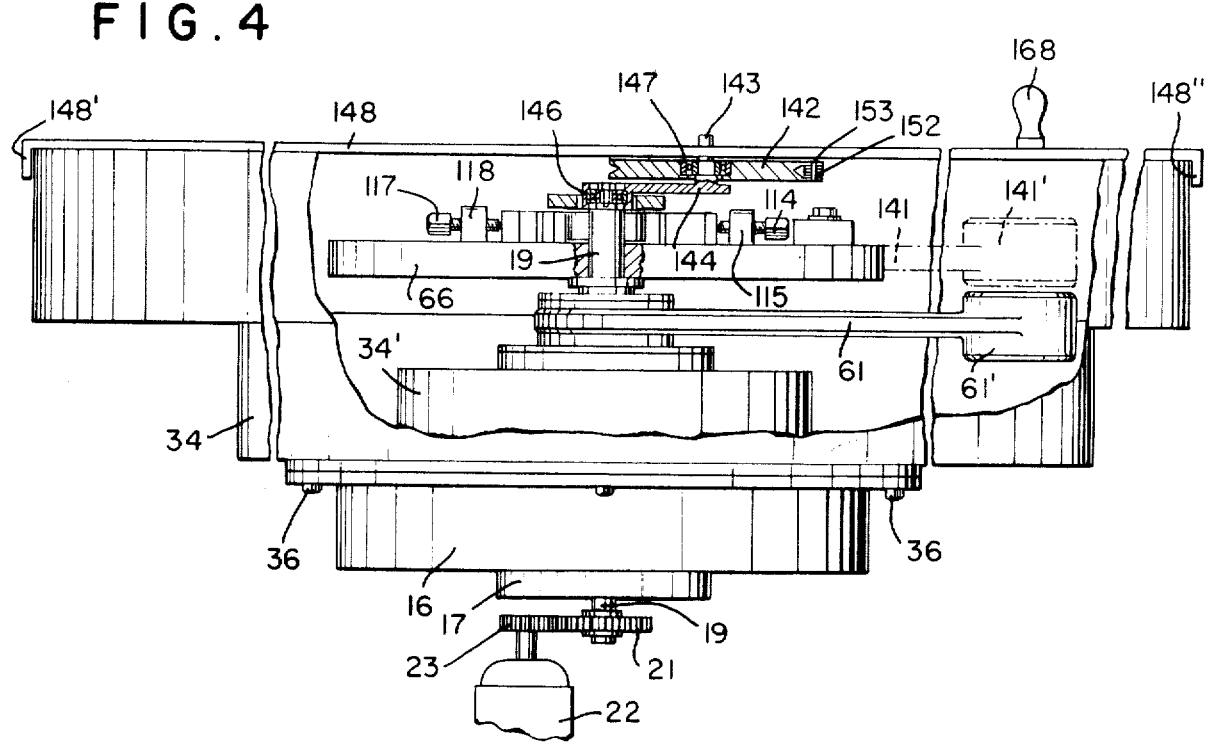
FIG. 4 is an enlarged vertical elevational view of the propulsion drive mechanism with its casing broken-away to show the interior construction thereof and with certain of the parts thereof being in section, the sectional portions being taken generally on line 4—4 of FIG. 1.

Referring now particularly to FIGS. 1, 2 and 4 of the drawings, a bottom gear casing part 16 has a depressed bearing and shaft support portion 17 in which is supported a ball-bearing unit 18 that supports a vertically-extending power shaft 19 that extends upwardly therefrom and downwardly through the bottom support portion 17. On the lower end of the shaft 19, there is fixed a power drive gear 21 that is driven by an electric motor 22 and its pinion 23 engaging therewith. While an electric motor is shown as the source of power, for this mechanism, it should be understood that any other source of rotary power can be used such as a gas engine or a turbine.

Laterally off-set from the power shaft 19 is an upwardly extending counter shaft 24 that is supported in a ball bearing unit 26 housed in an upstanding circular boss portion 27 on the inner face of the bottom gear casing part 16.

The power shaft 19 has a large drive gear 28 fixed thereto that meshes with the similar-sized gear 29 that is fixed to the counter shaft 24 thereto so as to impart reverse rotation of the countershaft 24 as the main power shaft 19 is driven in one direction.

The bottom casing part 16 has an upstanding side wall 31 with a peripheral flange 32 that supports an oversized intermediate partition plate 33 with its periphery extending radially outwardly from the flange 32 of the bottom casing part 16 so as to serve as a mounting in a rigid manner for the entire mechanism with the vehicle structure. An opposing separable top casing part 34 extends over the intermediate plate 33 and through its upwardly recessed bottom portion 34' it is connected together with the intermediate plate 33 and flange 32 of the bottom casing part by a series of circumferentially-extending fastening bolts 36 and through its bottom portion 34' and the still outer periphery of the intermediate plate 33 it is connected by a further series of circumferentially-extending bolts 37 to a supporting flange 38 of the vehicle frame structure which can be the internal frame of a land vehicle or that of a floating sea vessel.

The intermediate partition plate 33 has an upstanding circular boss portion 41 that houses a ball bearing assembly 42 and the ball bearing assembly is held therein by an annular retaining plate 43 fixed to the boss 41 and this ball bearing assembly 42 surrounds the power shaft 19. A further circular boss portion 44 houses a ball bearing assembly 45 that surrounds the counter shaft 24 and which is held in the boss portion 44 by an annular retaining ring 46 fixed thereto. These ball bearing assemblies 42 and 44 through the intermediate plate 33 gives further support to the respective rotating shafts 19 and 24 respectively operating therein.

Keyed to the countershaft 24 above its ball bearing assembly 45 is a chain sprocket 47 that is connected by a drive chain 48 to a sprocket portion 49 of a reverse weight hub support 51 journalled on the upper side of the upwardly recessed bottom portion 34' of the upper casing part 34 by a ball bearing assembly 52 and upon the power shaft 19 by vertically spaced ball bearing assemblies 53 and 54 enclosed within the hub 51 by retaining plate 56 fastened by screws thereto. The upper end of the counter shaft 24 is journalled in a ball bearing assembly 57 in a boss portion 58 upon the bottom portion 34' of the upper casing part 34.

Extending radially outwardly from the hub support 51 that will be driven in reverse rotation from the main power shaft with the same speed, is an integral weight arm 61 having a circular weight portion 61' on the outer end thereof.

The drive and steering mechanism can also be supported from depending lugs 62 and 63, of FIG. 2, on the upper casing part 34 and diametrically opposite from one-another.

Keyed by key 66' to the main power shaft 19 and held spaced from the ball bearing closure plate 56 of the reverse weight hub support 51 by a spacing washer 64, is a rotating base plate structure 66 upon the upper face of which are respectively mounted pivotably diametrically oppositely extending respective fly weight power arms 67 and 68 that are pivotally connected by respective ball bearing assemblies 69 and 71 at the respective inner ends of the fly weight arms and respectively connected by respective pivoted bolts 72 and 73 having their centers lying spaced from one-another and at the opposite sides of power shaft 19 at equal distances and in the same diameter taken through the center of the power shaft. A tie-bar 75 is connected by ball bearing units 75' and 75'' to the respective pivot pins 72 and 73.

The fly weight power arms 67 and 68 while driven about the center of the control shaft 19 can because of their pivot connections being radially removed from the center of the power shaft, pivot out of diametric alignment with one-another and yet while the base structure 66 is rotated by the main shaft 19 tend to be brought into diametric alignment due to the centrifugal action of their respective fly weights 74 and 76.

The fly weight arm 67 extends outwardly from its pivot pin connection 72 between two opposing spring biased pivot stops 77 and 78 respectively pivotally connected to the upper surface of the base plate structure 66 by respective pivot pins 79 and 81. The inner faces of these stops 77 and 78 will be engaged by the corresponding sides of the fly weight arm 67 and they are respectively urged toward one-another and toward the sides of the arm 67 by a tension spring 82 connected at its opposite ends by appropriate fastening screws and are drawn toward one another by the spring 82 until their inner ends respectively engage respective stop screws 83 and 84 threaded repsectively in respective upstanding lugs 85 and 86 so that their inner ends will respectively engage the inner ends of the respective spring-biased pivot stops 77 and 78. The opposing faces of the stops 77 and 78 may respectively have wear or cushioning pads 87 and 88 by engagement with the corresponding faces of the arm 67. By adjusting the screws 83 and 84 the action resulting from the fly weight arm 67 and its fly weight 74 may be predetermined in the angle at which the fly weight arm 67 can be off-set from the diametrical line and changed. Since it is inherent in the operation of the mechanism as will appear to be more apparent as the description proceeds, the arm 67 will engage with greater force the pivot stop 77, than against the pivot stop 78. Accordingly, the stop 77 is further biasingly held by two long tension springs 89 and 91 respectively attached by fastening screws 98 and 99 as shown to the stop 77 and extending laterally over the stop 78 for attachment by means of screws 92 and 93 to the top of the outer end of a lug 94 lying laterally beyond the spring stop 78 and fixed to the base plate structure 66 by a fastening bolt 96 in a rigid manner. The spring stop 77 is thus spring biased by three springs while the spring stop 78 is biased by solely one spring 82. Thus, the fastening screws for the respective springs 82, 89, and 91 for the connection of the spring to the springs stop 77 are indicated respectively at 97, 98, and 99 and the screw for the attachment of the spring 82, 89 and 92 to the stop 78 at 101, 92 and 93.

The fly weight arm is longitudinally ribbed as indicated at 102, and is bifurcated at 103 on its outer end to receive short fly weight arm 104 for effecting a free steadying pivot connection therewith on a vertically extending double-headed pivot pin 106. The fly weight 74 is integrally formed on the outer end of the short arm 104 and will move outwardly under centrifugal action in the direction of the arrow shown in FIG. 1 ultimately to be limited in its outward movement by a tension cable 107 connected by a screw 108 to the top of the fly weight 74 and anchored to a lug 109 carried by the pivot screw pin 81 that fastens the stop 78 to the base plate 66. As soon as tension is placed upon the cable 107, the fly weight 74 will have moved outwardly under centrifugal action to its predetermined limited distance or angled about the pivot connnection of its arm 104 to the pivot pin 106 carried in the bifurcated outer end 103 of the fly weight arm 67. Thus, the movement of the fly weight arm 67 about its pivot pin 72 and of the fly weight 74 can be predetermined by the power of the springs interconnecting the spring stops 77 and 78 and the rigid anchor lug 94, the adjustment of the spring stop screws 83 and 84 and the length of the wire tension cable 107, all as desired for the best operation of the mechanism for a given installation.

The arrangement of the left side fly weight arm 68 and the fly weight 76 between spring-biased pivot stops 111 and 112 is similar to the arrangement just described in connection with the fly weight arm 67 and the fly weight 74, except being upon the opposite side of the power shaft 19 in order to have an equilibrium of gyratory movement of the fly weights 74 and 76 the flyweight 76 extending angularly oppositely than flyweight 74 from the arm 67 and the fly weight 74. The spring stop 111 is pivoted upon a screw 113 in the base plate 66 and held against an adjusting screw 114 extending through lug 115 thereupon to engage the inner end of the pivot stop 111. The pivot stop 112 opposes the pivot stop 111 and is connected to the base plate 66 by a pivot screw 116 so that its inner end engages adjusting screw 117 adjustable in lug 118. The two spring biased pivot stops 111 and 112 are biased toward one-another by a short tension spring 119 connected by a screw 121 to the pivot stop 111 and by a screw 122 to the pivot stop 112.

Since the spring pivot stop 111 receives the greater force from the fly weight arm 68, two long tension springs 123 and 124 are connected by screws 125 and 126 respectively to the spring pivot stop 111 and anchored by respective screws 127 and 128 to laterally-extending lug 129 rigidly secured to the base plate 66 by a bolt 131 opposite from the lug 94 for the springs 89 and 91 of the spring stop 77. The fly weight 76 has a rigid arm 132 that is pivotally connected to a bifurcated end portion 133 of the fly weight arm 68 by a double headed pivot pin 134 and restrained against outward movement by wire tension cable 135 fixed to the fly weight 76 by a fastening screw 136 and anchored to pivot pin 116 of spring stop 112 by a lug 137. This wire cable 135 can instead be anchored to a lug 138 on the fixed lug plate 129 for the long tension springs 123 and 124, and in the same manner the cable 107 for the fly weight 74 can be anchored to the lug plate 94 by fastening the end of the same to loop lug 139 carried thereon.

Base plate 66 has some thickness and in plan is generally rectangular in shape except for its opposite ends being tapered and outwardly from which the fly weight arms 67 and 68 extend so that the fly weights 74 and 76 work in free space.

Extending radially upwardly from one edge of the base plate 66 is an integral weight arm 141 running radially from the center of the power shaft 19 that has an enlarged weight end 141' thereon, the center of which is the same radial distance from the center of the power shaft 19 as the center of the reversing weight 61' is from the center of the power shaft 19. These weights 61' and 141' are the oscillating weights that run in opposite directions from one-another as indicated by the arrows of FIG. 1 and in the same timed relation. It is with these weights 61' and 141' upon separating from one-another and with the fly weights 74 and 76 being positioned to have the minimum effect that a forward thrust of the mass drive and steering mechanism and the vehicle or seacraft is effected in the direction of central arrow T of FIG. 1. This is effected much as one makes with both arms in opposite directions of rotation when swimming the breast stroke and in a manner that will be more apparent as the description proceeds. As these weights 61' and 141' are moving oppositely from one another in the direction of the arrows of FIG. 1 the fly weight arms 67 and 68 are brought tightly against the strong spring stops 77 and 111 by a pulley-like device 142 that rotates about its pivot 143 located forwardly of the power shaft 19 in the direction of the arrow T. This pulley-like device 142 rotates about a fixed vertical shaft or pin support 143, FIG. 4, on an overhang eccentrically extending arm 144 that is connected to the upper end of the power shaft by a ball bearing assembly 146 so that the shaft 19 rotates fee support arm 144 and thus merely support it as best seen in FIG. 4. The pulley-like device 142 is journaled upon the pivot pin 143 by a ball bearing assembly 147 and this pivot pin 143 is integrally formed on the outer end of the arm 144. In order that the arm 144 is further retained against rotation yet providing a support for the pulley like device 142 so that it can be held against movement by anchorage of pin support 143 extending upwardly through a steering control arm 148, that extends diametrically over the top casing part 34.

The pulley like device 142 can thus rotate about its pivot pin 143 but the pivot pin 143 and the arm 144 upwardly from which it extends is restrained against rotation upon the upper end of the power shaft 19 by the anchorage and control arm 148. Thus, the base plate 66 rotates with power shaft 19 taking the fly weight arms 67 and 68 with it and under the pulley like device 142.

A chain link 151 is housed in an arcuate-shaped trough-like extension 152 formed on the pulley-like device 142 anchored thereto against lateral movement through the extension 152 by a center pin 153, FIG. 1. The anchor link 151 is of arcuate shape and serves for the connection of the pulley-like device 142 by chain links 154 and a strong tension spring 155 fixed to an upstanding anchor projection 156 on the fly weight arm 67 to tend to hold the fly weight arm 67 in an angled position offset from the diameter line through the center of the pivot pins 72 and 73 and power shaft 19 and against the arm stop 77. This is effected against the action of the tension springs 82 89 and 91 when the pulley like device 142 assumes the up position as view in FIG. 1.

Similarly, the control anchorage chain link 151 is connected through a chain 157 and a heavy tension spring 158 to an anchor post 159 extending upwardly from the fly weight arm 68 so as to pull, at the same time the fly weight arm 67 is pulled against its stop 77, the fly weight arm 68 against its stop 111 against the action of the springs 119 123 and 124 and when the link pin 153 with the link is in the position shown in FIG. 1 so that the fly weight arm 68 is also angled forwardly from diametrically extending line through pivot arms 72 and 73 and from the center of power shaft 19.

The tendency for the fly weights 74 and 76 as the shaft 19 and the base plate 16 are rotated, is to move outwardly to their full extent and even to be straight in line with the axis with the fly weight arms 67 and 68 to which they are pivotably connected, but their outward movement is restricted by their respective cable wires 107 and 135. With the fly weight arms 67 and 68 running free of action of the pulley like device 142 the effective moment arm for maintaining the equilibrium of gyratory motion will be with the arms 67, 68 extending co-axially with center line normal to the axis of the shaft 19 and through the center of the pivots 72 and 73 of the respective arms 67 and 68. At this time maximum effective gyratory equilibrium and centrifugal force is established in the mechanism. The pulley-like device 142 will have rotated about its own pivot pin support 143 with the arms 67 and 68. The pulley device pin support 143 is restrained against motion about the shaft 19 by support arm 144 being pivotally connected by the ball bearing assembly 146 on the upper end of the shaft 19 and the upstanding pin support 143 held against lateral movement by the transverse extending control arm 148. The fly weights 74 and 76 are the power weights that have free motion through 180 degrees as the pulley device 142 has been rotated to relax the strong spring chains 154 and 155 at 180 degrees and relaxed below the position shown in FIG. 1 with the pulley weight extension 152 being brought with chains 154 and 155 to below the pivot pin 143 of the pulley device 142 so that the arm 67 and 68 and the fly weights 74 and 76 are relaxed. Upon the further rotation of the fly weights 74 and 76 through the relaxing movement, the weight arms 67 and 68 will tend to straighten out into alignment with the diametrical center line radially extended the power shaft axis, the fly weights 74 and 76 will be free along with arm 67 and 68 to give a greater effective moment arm so that maximum centrifugal action and power inertia to maintain rotation of the mechanism is effected at this time. As the cycle of rotation of the base plate 66 and the arms is continued in the clockwise direction after having passed the relaxing period, they will again go into a restrictive period with the pulley device 142 and the chains 154 and 155 coming again into the positions shown in FIG. 1 through its maximum point of pull as shown therein so that the arms 67 and 68 are brought more tight against their stops 77 and 111 during this time whereby since the arms 67 and 68 are not pivoted on the shaft center of the shaft 19 the effective moment arm for the fly weights 74 and 76 will have been lessened since the arm 67 and 68 are drawn off the diametrical center through the axis of shaft 19 and since the arms have their pivotal connections 72 and 73 at points radially removed therefrom. Thus, there is at this time as shown in FIG. 1 the arms 67 and 68 angled upwardly to change the length of the effective moment arms for the weights 74 and 76, the energy being put into the mechanism is lessened at this time as the pulley device and the chains work upon the arms 67 and 68 to pull them toward their spring stops 77 and 111 and off the diametrical center line. Thus, for one-half of the cycle the power fly weights and their arms 67 and 68 are unrestricted for normal centrifugal action but by use of the pulley device 142 and the chains 154 and 157 the arms 67 and 68 are held against their stops and restricted again against free centrifugal motion. These chains 154 and 157 and their springs 155 and 158 provide an extensible cable that runs over the offset pulley 142.

The reversing rotating arm 61 with its weight 61' and the rigid arm 141 on the base plate 66 with its weight 141' are timed to pass one-another in their direction of rotations as best seen in FIG. 1 when the pulley device 142 is coming into position where the maximum restricting effect is made upon the arm 67 and 68 and the effective moment arms are lessened to give to the mechanism at this time as the weights 61' and 141' move in the direction of the arrows as shown in FIG. 1 the thrust is forwardly in the direction shown by the arrow T to obtain forward movement of the mechanism and of the vehicle to which it is attached to propel, the vehicle being, on land, or in the water, according to the use made of this mechanical propulsion drive mechanism. Because of the changing at this time as shown in FIG. 1 of the lessening of length of effective moment arms of the fly weights 74 and 78, the oscillating weights 61' and 141' will give to this mechanism a power thrust more or less as by one in swimming in making a breast stroke. This thrust power should continue while the weights 61' and 141' move respectively from their forward positions through 180° respectively to their rearward positions. As the oscillating weights 61' and 141' are returned to the forward positions from the rear positions power weights 74 and 76 will be relaxed and will build up energy until the weights 61' and 141' have again started to move to their rearward positions so that thereafter they will further deliver thrust to the mechanism. Each of the weights 74 and 76, 61' and 141' move through complete 360 degree cycles of rotation. The fly weights 74 and 76 are the power weights to maintain to maintain gyratory centrifugal equilibrium of the mechanism and the two weights 61' and 141' are the oscillating and thrust power weights with one of the weights being in rotation opposite from the other. The oscillating weight 141' moves clockwise as viewed in FIG. 1 and the weight 61' operated by a reverse drive moves counter-clockwise.

Figure 3A:
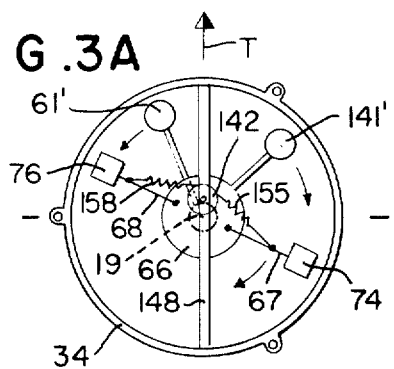
FIGS. 3A through 3H are respectively schematic diagrams of eight different sequences of one complete cycle of operation of the centrifugal propulsion drive and steering mechanism and showing the corresponding positions of the centrifugal power fly weights relative to the reverse rotating, propelling and oscillating weights.

The oscillating weights 61' and 141' provide the energy for propelling the mechanism and the vehicle to which the mechanism is attached or anchored and this is done in proper sequence before each revolution and throughout 180 degrees thereof. The power weights 74 and 76 have a separate mode of operation, the off-set pulley device 142 and the chains 154 and 157 with their strong springs 155 and 158 hold the power weight arms 67 and 68 and thus the power weights themselves, securely through 180 degrees of one revolution, and while this is being done the oscillating weights 61' and 141' are also performing in operation for their 180 degrees of one revolution so that a severe forward thrust in the direction of the arrow T of the mechanism and the vehicle is effected. Any tendency of the oscillating weights 61' and 141' on their return movements, after having provided thrust to the mechanism, is negatived by the coming into play the fly or power weights 74 and 76 as they at this time are made free to give their maximum centrifugal force. Since the fly weights 74 and 76 are still moving in their first initial direction, they almost neutralize the second half of the energy released by the oscillating weights 61' and 141' so that any reverse motion of movement of the mechanism that they may tend to develop is negated. Thus this mechanical propulsion mechanism moves as a mass in only one direction providing thereby movement to a vehicle or vessel in which the mechanism is fixedly mounted. The respective diagrammatic sketches of FIGS. 3A to 3H are eight different showings at 45° of one complete cycle of rotation of the weights and their motions and a specific description will be made to each of these Figures to provide further details of what takes place. In the sketch as shown in FIG. 3A, the oscillating weights 61' and 141' have turned back and are starting their power thrust stroke running in reverse directions from one another as indicated by their respective arrows. The main power thrust stroke is being applied at this time, and the entire mechanism with the vehicle to which it is attached is being thrust forwardly in the direction of the arrow T. The off-set pulley device 142 lies at all times in its forward position and rotates about its pivot on the transverse control member 148 and with its pivot always remaining off-set ahead of the axial center of the power shaft 19 and along the control member 148. The strong chain springs 155 and 158 are connected respectively to the power arms 67 and 68 carrying the respective power or fly weights 74 and 76 have pulled the arms 67 and 68 from the diametrical center line to give to the fly weights less moment arm at this time. With the control arm 148 set as shown in FIG. 3A and the pulley device 142 being off-set forwardly from the center axis of the shaft 19, the power thrust movement will always be in the direction to which the control lever 148 extends with the pulley-like device 142.

Figure 3E:
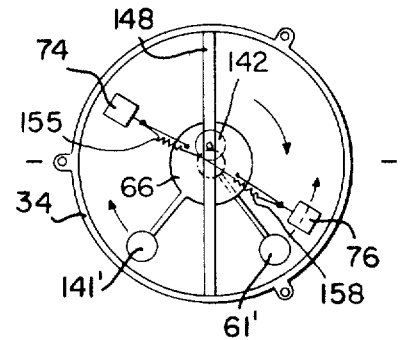
Figure 3B:
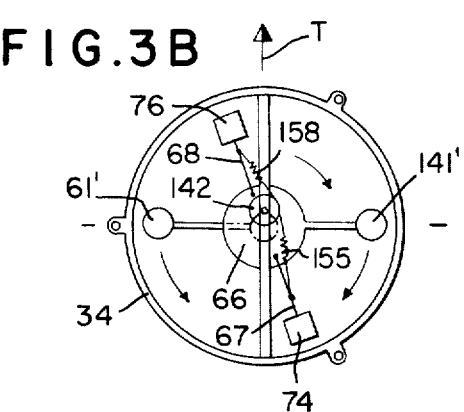
Figure 3F:
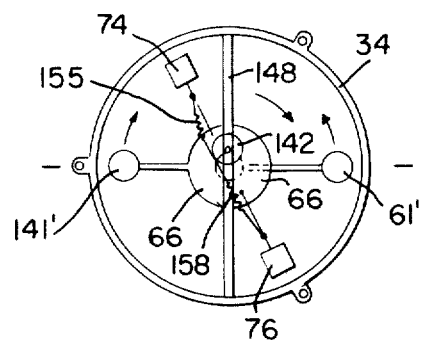

In FIG. 3B, the rotation of the power weights 74 and 76 will have moved through 45 degrees from their positions in FIG. 3A and the spring chains 155 and 158 while still tight over the pulley device 142 will have relaxed to some extent to give free motion to the fly weights 74 and 76. The oscillating weights 61' and 141' are still giving thrust to the mechanism and the maximum power thereto to continue the forward thrust of the mechanism in the direction of arrow T. All weights are being held securely and are running through the positive cycle for the mechanism. Oscillating weights 61' and 141' are extending laterally from one another.

Figure 3C:
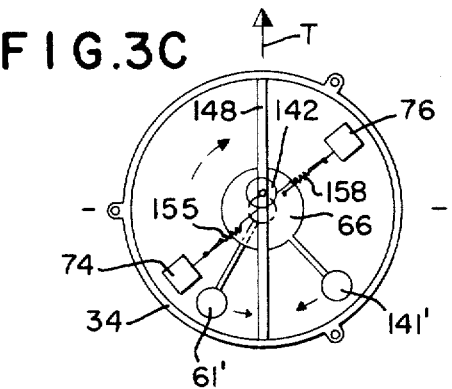

In FIG. 3C, all the weights will have passed through another 45 degrees so that their positions are relatively different from their positions as shown in the prior Figures. The two power weights 74 and 76 will have been released by the turn of the pulley device 142 on its eccentric center and the tension cable close to power shaft axis 15, to release the springs 155 and 158 to thereby free the fly weights 74 and 76 to give them maximum action. The mechanism is still moving in the direction of the arrow T. The oscillating weights 61' and 141' are closing toward one-another and coming to the ends of their thrust stroke. In FIG. 3D, the fly weights 74 and 76 will have been advanced another 45 degrees and are still relaxed since the spring chains 155 and 158 have will pulley device 142 ridden down under its eccentric center. The oscillating weights 61' and 141' which direct the forward thrust power will have become neutralized in their action since they are overlying one-another and ready to be turned forwardly from opposite sides of the mechanism. They are starting their power cycles on the negative side while the mechanism is still moving in the direction of arrow T with the fly weights 74 and 76 still having free orbiting motion. The power weights 74 and 76 are still neutralizing the action of the oscillating weights 61' and 141'.

In FIG. 3E the oscillating weights 61' and 141' will have passed one another and are moving forwardly along the opposite sides or 45° from their overlying positions shown in FIG. 3D and at the same time power or fly weights 74 and 76 are in free orbital motion so as to make use of their positive power to react against the oscillating weights 61' and 141' through their negative power cycle. The oscillating weights 61' and 141' are extended to respective opposite sides and will have come to the end of their power cycle on their negative side. The power weights 74 and 76 are somewhat free in their orbiting cycle and have lost their postive power thrust action.

Figure 3G:
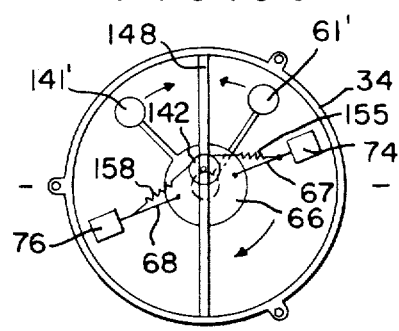
Figure 3D:
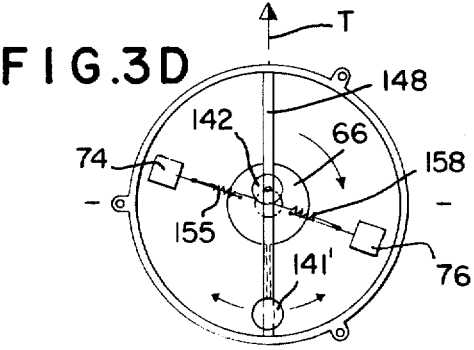

In FIG. 3G, the oscillating weights 61' and 141' have moved forwardly through 45 degrees and would have given a negative thrust of same extent towards the negative side, or rearwardly. The arm for the power weights 74 and 76 are now locked by the tension spring chains 155 and 158 to bring them out of their free orbital movement and to lessen their moment arm effects and these weights 74 and 76 are thus being secured before the postive thrust power begins.

Figure 3H:
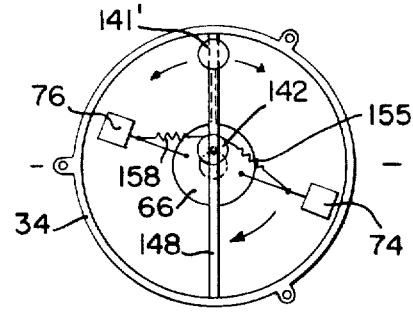

The FIG. 3H illustrates that the oscillating weights are in their forward position ready to start a forward stroke of thrust, and overlie one-another. The power of fly weights 74 and 76 will have been relaxed and the oscillating weights 141' and 61' are passing one-another so that a start of a new power thrust motion is to be effected by the oscillating weights 61' and 141' and a new thrust cycle to be started with the fly weights 74 and 76 relaxing as the oscillating weights 61' and 141' spread from one-another.

Figure 5:
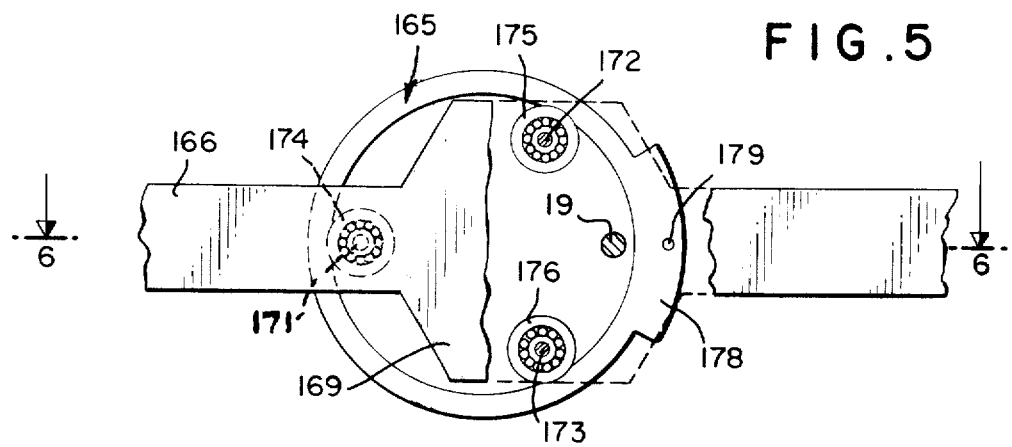
FIG. 5 is a fragmentary plan view of a modified off-set leverage pulley assembly.
Figure 6:
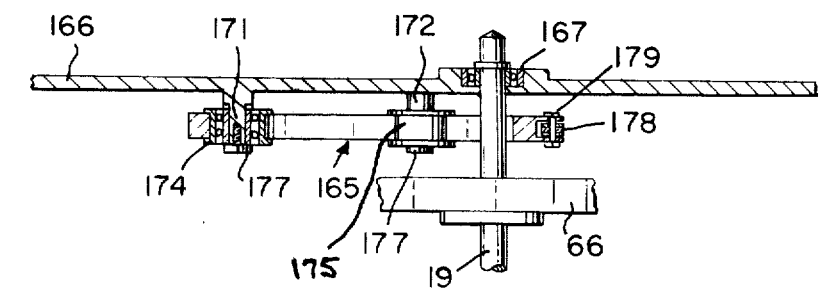
FIG. 6 is a vertical sectional view of the modified leverage pulley assembly as view on line 6—6 of FIG. 3.

In FIGS. 5 and 6, there is shown a modified form of the control arm and off-set leverage pulley device that can be used in lieu of the pulley device 142, but operable in its action in the same manner as above described.

As shown in FIG. 4 control arm 148 is an elongated strap that extends across the diameter of the casing 34 and rests upon its upper edge thereof. The ends of the control arm 148 are turned down as indicated in 148' and 148" in FIG. 4, so as to maintain the adjustment of the control arm 148 about the periphery of the casing 34 and to hold the leverage pulley device 142 in position angled about the shaft 19. The adjustment of the control arm 148 and the leverage device will determine the direction which the propulsion mechanism and its thrust power will be given.

In the form of the invention shown in FIGS. 5 and 6, the leverage pulley device as indicated at 165 is wholly supported upon a transversely extending control lever 166 that is permanently connected to the upper end of the power shaft by a ball bearing unit 167 so that the power shaft can be used as a center above which the control strap or lever 166 can be rotated instead of being dependent upon the depending ends 148' and 148" of the transverse strap 148 of FIG. 4. A handle can be provided upon this strap such as an upstanding handle 168 of FIG. 4, that can be grasped to effect the turning of the same about its center, but in the case of the form shown in FIG. 6 above the pivot shaft 19 which is used as a center. The construction of FIGS. 5 and 6 thus eliminates the need of the mounting of the arm 144 or swinging movement upon the power shaft 19 of FIG. 4. In this form, the strap of control arm 166 has an enlargement 169 intermediate of its length, and from the underside thereof there depends three studs 171, 172, and 173, each of which carry respectively ball bearing assemblies 174, 175, and 176 held in place thereon by retaining screws 177. These ball bearing assemblies are externally grooved to support the leverage pulley or ring 165 against displacement and in a manner eccentric to the power shaft 19. The tension chain spring devices are connected by an interconnecting assembly 178 and a fastening bolt 179 so that the chain and tension springs 155 and 158 will be used in the same manner with the fly weight parts to keep them in control, the same as has been explained with the leverage pulley-like device 142 of the above description.

It should be noted that the leverage pulley-like device 142 or the ring 165 has its own pivot and that pivot is off-set to the vertical axis of the power shaft 19 and its pivot center is fixed to the control strap 148 or 166 and lies for a rotation about a fixed pivot ahead the axis of the power shaft 19 and direction of travel as can be best viewed in the illustrative FIGS. 3A to 3H. This leverage control pulley-like device 142 or the ring 165 can only be moved by the control strap or lever 148 or 166 and by doing so a new direction of movement of the propulsion mechanism will be given. If one turns the control lever 148 or 166 about its pivot on the axis of the power shaft, to the right or to the left, as view in the illustrative FIGS. 3A to 3H, the direction in which the propulsion impulses or movement of the mechanism will be changed. It can thus be seen that this propulsion mechanism while generating energy for the propulsion of the craft also by movement of its control lever 148 and 166 can serve as a steerable mechanism as well to change the direction of the craft or vehicle in which the mechanism is mounted to give propulsion to the same.

It should be understood that this propulsion mechanism has been developed for use on land and sea vehicles wherein the same adaptation for propelling the vehicle, as well as steering it, can be put to use. It can be seen that with the arrangement of two such propelling mechanisms on a ship, one at one end of the ship and one at the other end of the ship, that with the proper turning of the mechanism two such devices directed to propel in opposite directions at the opposite ends of the ship that can effect thus easy landing of the ship on a dock side, easy maneuverability will be provided. When used in vehicles to operate on land, a forward propelling force will be provided at any desired velocity and the vehicle can be brought to a stop without the use of braking power on any of the wheels, thereby giving an effective control of the vehicle on slippery roads. It shall be understood that the mechanism can be designed for heavy duty work as well as for less propulsion depending upon its design while employing the same principles of operation.

It shall be understood that while electric motors have been used as the source for effecting rotational power to the mechanism, mechanical engines or turbines can be used to obtain the same rotation and such engines or turbines can be coupled with the propulsion mechanisms either directly or through appropriate mechanical gearing including the gear 21 to one side or the other of the central drive shaft depending upon the nature of the installation to be made of the mechanism upon the craft.

A working model has been made of this mechanism by which propulsion and movement of the mechanism in a directional manner has been demonstrated with the operation of the same.

While various changes may be made in the detailed construction, it shall be understood that such changes shall be within the spirit and scope of the present invention as defined in the appended claims.

I claim:

1. A centrifugal propulsion drive and steerable mechanism comprising a power-rotated drive shaft, a base plate structure centrally connected to the drive shaft to be rotated thereby, gyratory power work arms respectively pivotally connected at their inner ends to the rotatable base plate structure on the respective opposite sides of the drive shaft evenly radially-spaced therefrom and along a diameter taken through the shaft axis, flyweights with arms respectively pivotally connected to the outer free ends of the respective flyweights power arms and extending in a restrictive manner from the leading edges thereof, a thrust-producing weight arm fixedly carried upon the base plate to be rotated therewith and extending in radially alignment with the shaft axis and outwardly from the base plate, said thrust weight arm extending at an angle generally normal to the diameter alignment of the pivotally connected inner ends of the gyratory power work arms with the base plate, a corresponding reversely driven thrust-producing weight arm rotatably connected to the power-rotated drive shaft to be turned thereabout independently of the base plate, said driven thrust-producing weight arm extending radially outwardly from the drive shaft to the same extent that the fixed thrust weight extends so that their weights will superimpose one another at times of rotation of and in the direction of movement of the mechanism, a counter shaft geared to the power-rotated drive shaft for revese rotation thereof and to the corresponding of the reversely driven thrust producing weight arm to reversely drive the same in union with and in opposition to the base plate fixed thrust-producing weight arm, said thrust producing weight arms superimposing on the line of directed movement of the mechanism both forwardly and rearwardly thereof and their thrust strokes or impulses being made with their rearward movement, power arm stops carried upon the base plate structure respectively to allow the respective gyratory power arms to be normally urged in a position thereon out of alignment with the diameter through the drive shaft axis and the pivots of the power arms and in the direction of movement of the mechanism, a pulley lever-like device offset from the drive shaft and free of the base plate and including an extensible cable connected between the gyratory power arms to normally urge them against the forwardly disposed spring biased stops periodically to lessen the effective length of the flyweight gyratory work arms and thereby relax the flyweight gyratory work arms at the time the reversely-operated thrust weight arms are making their effective thrust stroke rearward movements to cause the direction movement of the mechanism, said pulley lever-like device permitting a shortening of its extensible cable and the releasing of the gyratory power work arms and flyweights for maximum power effect with returning of the thrust-producing weights preparatory to their forward superimposed positions for further rearward thrust strokes, whereby power will be supplied to cause directional movement of the mechanism and a vehicle attached thereto.

2. A centrifugal propulsion drive and steerable mechanism as defined in claim 1 and further power arm stops carried by the base plate structure and opposing respectively the respective above-mentioned flyweight power arm stops and lying upon the respective opposite sides of the power arms to limit the angular shifting of the flyweight arms at time of relaxation of the pulley lever-like device beyond the full extension of the flyweight arms under centrifugal action and over the diameter line through the drive shaft and the flyweight arms.

3. A centrifugal propulsion drive and steerable mechanism as defined in claim 2 and said power arm stops being carried upon the base plate structure for lateral adjustment thereover, adjustable screws for limiting the lateral adjustment of the opposing power arm stops toward the respective opposite faces of the flyweight power arms and biasing means actionable upon the opposing power arm stops to hold them against their adjustable limiting screws.

4. A centrifugal propulsion drive and steerable mechanism in claim 2 and said pulley lever-like device for relaxing the effectiveness of the flyweights comprising a pulley lever means for pivotably carrying said pulley for rotation radially offset from the axis of the power shaft upon the upper end thereof including an offset arm pivotally connected upon the drive shaft for angular adjustment thereabout free of rotation of the power shaft and an offset axial pin support extending upwardly from the outer end of the arm for rotatably connecting the pulley lever thereto, means for staying the offset arm against rotation about the drive shaft and the base plate, said extensible cable anchored intermediate its length to the pulley lever and its outer ends respectively connected to the respective gyratory flyweight work arms tending to urge the flyweight arms toward the first-mentioned flyweight arm stops, the pulley lever being rotatable with its extensible cable about the offset pin support, said extensible cable being relaxed as the base plate and work arms and its pulley lever are turned from its forward position through each rotation thereof and passing through a positon adjacent to the drive shaft axis and radially inwardly of the pulley lever pin support.

5. A centrifugal propulsion drive and steerable mechansim as defined in claim 4 and said means for staying the offset arm including a casing part surrounding the operable parts and adapted to be anchored to a vehicle, said casing part being open at its upper end and a steerable control member extending diametrically across the upper end of the casing and adapted to be turned around thereover, said arm pin support for the pulley-lever-like device extending upwardly through the steerable control member to effect adjustable movement of the pulley-lever-like device about the center of the drive shaft, said control member being concentrically arranged upon the mechanism casing and affixable thereto at any position thereabout to change the direction of movement of the mechanism and the vehicle.

6. A centrifugal drive and steerable mechanism as defined in claim 2, said pulley lever-like device for relaxing the effectiveness of the gyratory flyweight power arms including an open top casing part surrounding the operable parts and adapted to be connected to a vehicle, a steerable control member pivotably connected to the upper end of the power drive shaft and turnable over the open end of the casing part, a pulley rotatably carried on the control member free of the power shaft and laterally offset therefrom, said pulley lever-like device and its extensible cable being angularly adjustable about the power shaft by the steerable control member to change the direction of movement of the mechanism and the vehicle attached thereto.

* * * * *